United States Patent [19]

Herbin et al.

[11] Patent Number: 4,959,118
[45] Date of Patent: Sep. 25, 1990

[54] APPARATUS FOR APPLYING A PROTECTIVE FILM ON ONE FACE OF A SERIES OF OPHTHALMIC LENSES

[75] Inventors: Patrick Herbin, Morlaincourt; Jean-Claude Lacroix, Ligny-en-Barrois, both of France

[73] Assignee: Essilor International (Compagnie Generale d'Optique), Creteil, France

[21] Appl. No.: 305,091

[22] Filed: Feb. 2, 1989

Related U.S. Application Data

[62] Division of Ser. No. 173,291, Mar. 25, 1988, Pat. No. 4,826,548.

[30] Foreign Application Priority Data

Mar. 30, 1987 [FR] France ............................ 87 04375

[51] Int. Cl.$^5$ ............................................ B32B 31/00
[52] U.S. Cl. ..................... 156/512; 156/152; 156/267; 156/514
[58] Field of Search ............... 156/152, 230, 248, 251, 156/344, 353, 514, 517, 519, 521, 584, 522, 512, 267; 83/219, 732

[56] References Cited

U.S. PATENT DOCUMENTS

| | | |
|---|---|---|
| 2,608,503 | 8/1952 | Meyer .................................. 156/152 |
| 3,445,981 | 5/1969 | Hori . |
| 4,242,162 | 12/1980 | Ronning et al. ..................... 156/522 |
| 4,333,781 | 6/1982 | Meulenberg ......................... 150/541 |
| 4,759,818 | 7/1988 | Hiroshi ................................ 150/240 |

FOREIGN PATENT DOCUMENTS 0416199 6/1985 European Pat. Off. .
2241193 3/1975 France .

Primary Examiner—Michael W. Ball
Assistant Examiner—Louis Falasco
Attorney, Agent, or Firm—Oblon, Spivak, McClelland, Maier & Neustadt

[57] ABSTRACT

A roll of composite tape composed of an adhesive tape and a strippable backing tape is paid out, and the adhesive tape and the strippable tape are separated. A circular hole of predetermined diameter is punched through the strippable tape, and the strippable tape and the adhesive tape are brought back together again such that a circular portion of the adhesive face of the adhesive tape remains exposed through the circular hole punched in the strippable tape. The exposed portion of the adhesive face of the adhesive tape is applied against a face of a lens placed on a support by displacing at least one of the support and a buffer toward each other. A cutting device is used to cut the adhesive tape around the peripheral edges of the lens, and the lens is removed together with its cut-out portion of adhesive tape. The remaining portion of the adhesive tape and the punched strippable tape is also removed, and the above operations are repeated for each lens in a series of lenses.

9 Claims, 3 Drawing Sheets

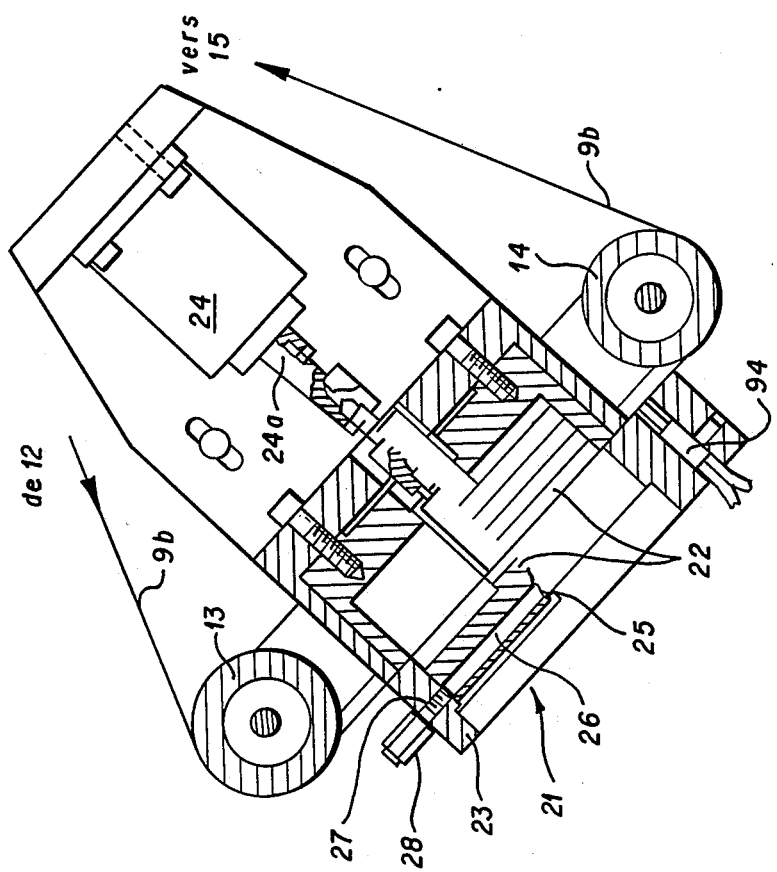

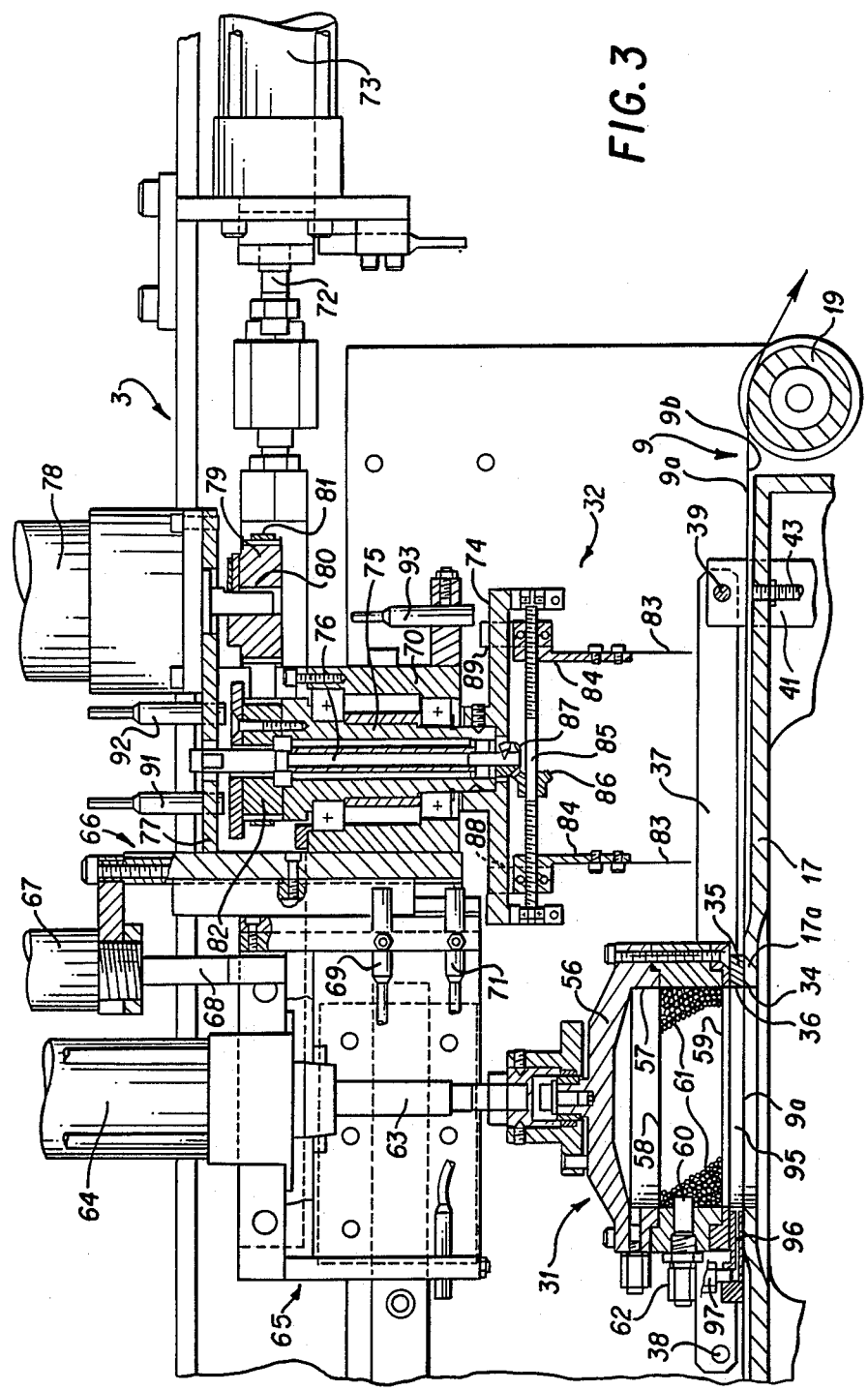

APPARATUS FOR APPLYING A PROTECTIVE FILM ON ONE FACE OF A SERIES OF OPHTHALMIC LENSES

This is a division, of application Ser. No. 173,291, filed Mar. 25, 1988 now U.S. Pat. No. 4,826,548.

The present invention relates to a method and to an apparatus for applying a protective film on one face of a series of ophthalmic lenses.

BACKGROUND OF THE INVENTION

In the manufacture of ophthalmic lenses, it is often necessary to apply an adhesive film on the surface of a lens in order to protect the lens against scratching or against chemical attack by foreign bodies e.g., during "blocking" (i.e., when a metal block is fixed on one face of the lens by casting a low melting point metal onto the lens for the purpose of subsequently mounting the lens on the lens holder of a surfacing machine, an edging machine), or a polishing machine. It is particularly recommended that such an adhesive protective film be applied on lenses made of an organic material. However such a film may also be applied to lenses made of glass.

In order to apply an adhesive film on a face of a lens, one prior method consists in placing the lens in an upwardly open cavity on a support capable of being moved vertically within the cavity under the control of an actuator. An adhesive tape is then brought manually over the cavity in which the lens is located, thereby closing the cavity. An annular jaw is then manually displaced to keep the adhesive tape pressed against the edge of the opening to the cavity. The lens support is then moved vertically upwardly under the control of the actuator, thereby applying the adhesive tape to the top face of the lens, optionally with the assistance of a vacuum if the cavity is connected to a vacuum pump. The adhesive tape is then manually cut by the operator around the lens by means of a cutting implement or "cutter". The jaw is then manually opened and the lens is manually removed together with the disk of adhesive film stuck to its top face. All, or nearly all of the above-mentioned operations are manual and therefore take place relatively slowly. Further, given that the adhesive tape is initially flat and that the face of the lens that needs protection is generally a curved surface, it is generally not possible to avoid forming folds when the adhesive tape is applied to the face of the lens, in particular when the face of the lens is highly curved (i.e., when it has a small radius of curvature). These folds prevent the adhesive tape from adherring properly to the face of the lens and make it impossible to obtain a layer of uniform thickness between the lens and the metal block which is subsequently cast onto the adhesive film.

OBJECTS OF THE INVENTION

The object of the present invention is therefore to provide a method and an apparatus for applying a protective film on one face of a series of ophthalmic lenses at a considerably higher rate than has been possible in the prior art.

A subsidiary object of the present invention is to provide an apparatus of the above-mentioned type in which the protective film is applied against the face of the lens without folds being formed, even if the lens has a small radius of curvature.

Another subsidiary object of the invention is to provide an apparatus of the above-mentioned type which is capable of applying the protective film over the entire face of the lens to be protected regardless of the diameter of the lens.

SUMMARY OF THE INVENTION

The present invention provides a method of applying a protective film on one face of each lens in a series of ophthalmic lenses. The method comprises the following steps: a lens taken from the series of lenses is placed on a support; a roll of composite tape comprising an adhesive tape having an adhesive face and a strippable backing tape covering the adhesive face is paid out; the strippable tape is separated from the adhesive tape; a hole of predetermined diameter greater than the diameter of the lens is punched in the strippable tape where separated from the adhesive tape; the punched strippable tape and the adhesive tape are brought together in such a manner as to leave a round portion of the adhesive face of the adhesive tape exposed through the hole punched through the strippable tape; the adhesive tape and the punched strippable tape are caused to pass between said support and a thrust buffer; the exposed portion of the adhesive face of the adhesive tape is applied against one of the faces of the lens placed on the support by relative displacement of at least one of the support and the buffer towards each other; the adhesive tape is cut around the peripheral edge of the lens; the lens together with the cut-out portion of adhesive tape stuck to the face of the lens and forming the protective film are removed; the remaining cut portion of the adhesive tape and the previously punched tape are removed; and the above steps are repeated for each lens in the series.

Preferably, during the operation of applying the adhesive tape to one of the faces of a lens, the strippable tape is punched in preparation for the operation of applying the adhesive tape to one face of one of the following lenses in the series of lenses. Further, during the operation of applying the adhesive tape to a face of a lens and during the operation of cutting the adhesive tape, the composite tape is clamped between two jaws having circular holes which are in register and which have inside diameters corresponding to the diameter of the hole punched in the strippable tape.

Apparatus for implementing the method of the present invention essentially comprises a pay-out spool carrying a roll of composite tape comprising an adhesive tape having an adhesive face and strippable backing tape covering the ahdesive face; a first set of guide rolls for guiding the composite tape along a predetermined path; a second set of guide rolls for guiding the strippable tape of the composite tape along a loop path going away from the predetermined path and returning thereto; a punch device placed on the loop path for punching the strippable tape; a lens support situated on one side of the predetermined path of the composite tape adjacent to the strippable tape and downstream from the loop path; a thrust buffer situated on the other side of the predetermined path and in register with the lens support; at least one of the lens support and the thrust buffer being mounted to move perpendicularly to the predetermined path; at least one actuator means connected to one of the lens support and the buffer for pressing the composite tape therebetween; a cutting device situated on the predetermined path of the composite tape downstream from the loop path; and drive means acting on the composite tape in order to displace it along the predetermined path.

Preferably, the punch device comprises a punch and a die having a diameter greater than the largest existing diameter of ophthalmic lenses. Preferably, the cutting device comprises a support mounted to rotate about an axis which is perpendicular to the predetermined path of the composite tape, two cutting blades mounted on the support extending parallel to the axis and disposed at equal distances therefrom, and a motor coupled to the support to rotate together with the two cutting blades about the axis. Advantageously, the distance between the two cutting blades and the axis is adjustable.

BRIEF DESCRIPTION OF THE DRAWINGS

An embodiment of the invention is described by way of example with reference to the accompanying drawings, in which:

FIG. 2 is a section view on a larger scale showing the punch device of the FIG. 1 apparatus; and FIG. 3 is a view partially in side elevation and partially in vertical section showing other active components of the FIG. 1 apparatus to a larger scale.

MORE DETAILED DESCRIPTION

Figure 1:
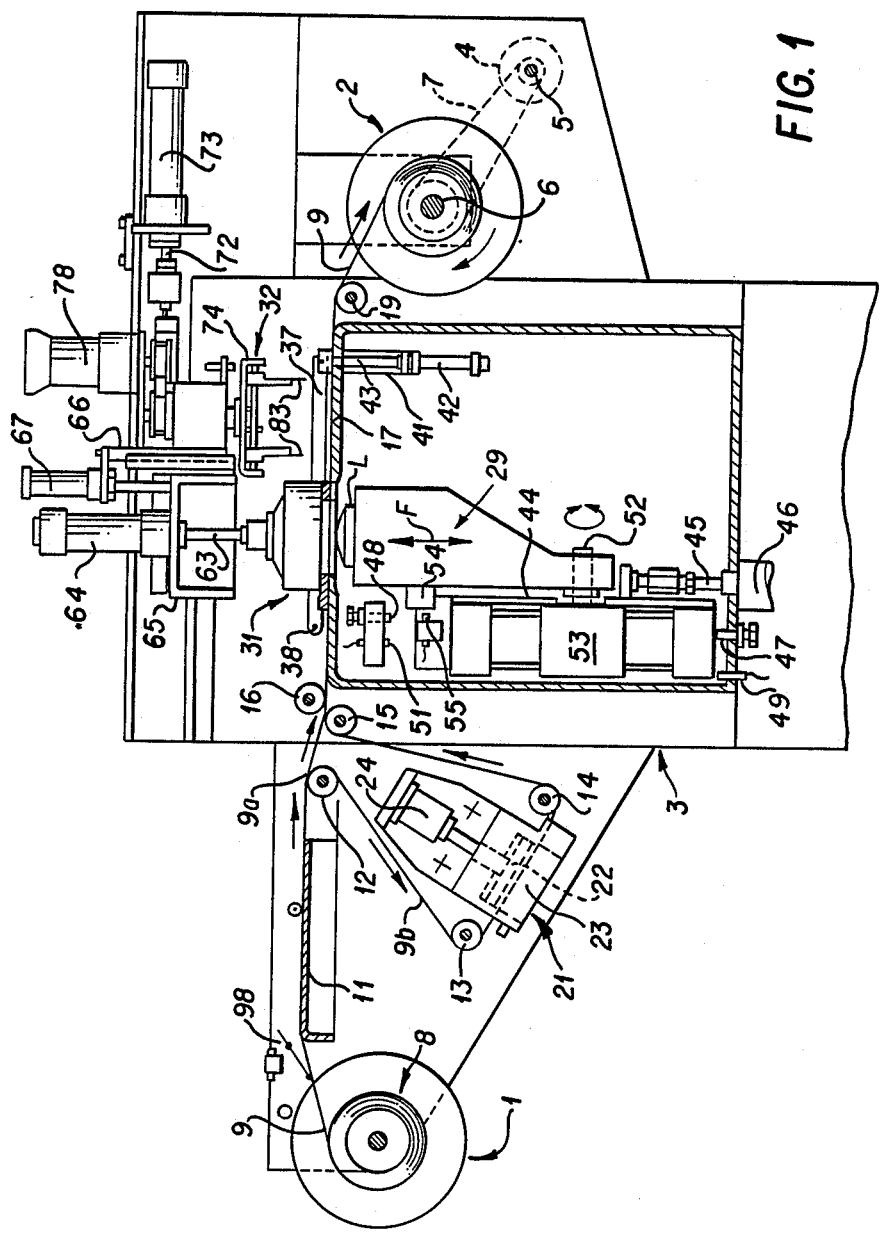
FIG. 1 is a view which is partially in side elevation and partially in vertical section showing one embodiment of apparatus in accordance with the invention.

The apparatus shown in FIG. 1 may constitute a portion of a "blocking" machine for casting a low melting point metal block onto an ophthalmic lens. It comprise a pay-out spool 1 and a take-up spool 2 which are rotably mounted on a frame 3. The take-up spool 2 may be rotated by a motor 4 e.g., an electric motor having an output shaft 5 connected to a drive shaft 6 of the take-up spool 2 via an appropriate transmission 7, (e.g., a chain transmission.)

The pay-out spool 1 carries a roll 8 of a composite tape 9 comprising an adhesive tape 9a and a strippable backing tape 9b covering the adhesive face of the adhesive tape 9a. The composite tape 9 which is paid out from the roll 8 passes initially over a first table 11, then over a guide roll 12 at the outlet from which the strippable tape 9b is separated from the adhesive tape 9a. Thereafter, the strippable tape 9b follows a loop path passing successively over guide roll 13 and a guide roll 14, and then the two tapes 9a and 9b are brought back together again by passing through a pair of rolls 15 and 16. Thereafter, the composite tape 9 passes over a second table 17 at a small distance above the top face thereof, then passes round a guide roll 19 and is taken up on the take-up spool 2. The composite tape 9 may be constituted, for example, by a tape sold by the 3M Company under the reference 1641.

The FIG. 1 apparatus further comprises a punch device 21 (shown in greater detail in FIG. 2) which is installed on the loop path followed by the strippable tape 9b between the guide rolls 13 and 14. Preferably, the punch device 21 comprises a punch 22 and a die 23 which respectively have an outside diameter and an inside diameter slightly greater than the largest existing diameter of an ophthalmic lens. For example, the diameter of the punch 22 and the die 23 may lie between 85 mm and 90 mm. The punch 22 is driven by being connected to a piston rod 24a of an actuator 24 (e.g., a pneumatic actuator). Each time the punch 22 is activated, the disk it cuts out from strippable tape 9b is ejected by a blast of compressed air coming through a preferably circular hole 25 formed in the center of the front face of the punch 22. The circular hole 25 communicates with a passage 26 which is radially drilled in the punch 22 and which communicates with a passage 27 formed radially in the die 23 when the punch 22 is in the position shown to the left of FIG. 2. The passage 27 passing through the die 23 is connected by a connector 28 and by a pipe (not shown) to a supply of compressed air (also not shown).

The FIG. 1 apparatus further includes a lens support 29, a thrust buffer 31, and a cutting device 32. A lens L which is to have one of its faces (e.g., a convex face) covered with a protective film may be placed on the lens support 29. The lens support 29, is situated beneath a preferably circular hole 34 (more clearly visible in FIG. 3) in the second table 17. The diameter of the circular hole 34 is equal to or slightly greater than the diameter of the circular hole formed by the punch device 21 in the strippable tape 9b. The lens L may be held on the lens support 29 for example, by means of a suction device (not shown). The thrust buffer 31 is situated above the composite tape 9 and the circular hole 34. The lens support 29 or the buffer 31, and preferably both of them, is/are capable of being displaced towards the other in a manner explained below for the purpose of applying the adhesive tape 9a of the composite tape 9 against the exposed face of the lens L carried by the lens support 29.

As can be seen more particularly in FIG. 3, a region 17a of the second table 17 surrounding the circular hole 34 is slightly raised relative to the plane top face of the second table 17 so as to form a fixed jaw suitable for co-operating with a moving jaw 35 for clamping the composite tape 9 during the operation of applying the adhesive tape 9a onto the exposed face of the lens L and during the operation of cutting the adhesive tape 9a (which operations are described below). The moving jaw 35 includes a preferably circular hole 36 the diameter of which is equal to or slightly greater than the diameter of the circular hole 34 and which is in register therewith. The moving jaw 35 extends between and is fixed to two parallel arms 37, only one of which is visible in the drawings, which arms are pivotally mounted at one of their ends about an axis 38. The opposite ends of the arms 37 are hinged about an axis 39 to the ends of respective tines of a U-shaped fork 41. The bottom of the fork 41 is fixed to a cylinder 42 of an actuator (e.g., a pneumatic actuator) including a piston rod 43 connected to the second table 17. Thus, by operating the actuator 42, 43, the moving jaw 35 may be moved at will away from the composite tape 9 in order to release it and enable it to advance, and alternatively clamp it against the region 17a, thereby clamping the composition tape 9.

A carriage 44 (FIG. 1) is mounted to move relative to the second table 17 in a direction which is parallel to the axis of the hole 34, as indicated by double-headed arrow F. The carriage 44 is connected to a piston rod 45 of an actuator 46 (e.g., a pneumatic), and it may be displaced between two limit positions defined respectively by an adjustable abutment 47 and an adjustable abutment 48. A detector 49 and a detector 51 are respectively associated with the adjustable abutments 47 and 48 and generate a signal whenever the carriage 44 reaches the corresponding limit position.

The bottom end of the lens support 29 is coupled to a shaft 52 which is capable of being rotated through a predetermined angle in either direction of rotation by means of an actuator device 53 carried by the carriage 44. The actuator device 53 may be constituted, for example, by a gear wheel which is fixed to the shaft 52 and which meshes with a rack connected to an actuator per se (e.g., a pneumatic actuator). Thus, the lens support 29 may be displaced between a first position which the lens support 29 and the lens L carried thereby are in register with the circular hole 34 through the second table 17, and a second position in which the lens support 29 is offset laterally from the circular hole 34. The first and second positions of the lens support 29 may be defined by a projecting part 54 which is fixed on one side of the lens support 29 and which is suitable for coming into contact with one or the other of two abutments (not shown) fixed to the carriage 44. Two detectors (only one of which, a detector 55, is visible in FIG. 1) are associated with respective ones of the two abutments and generate a signal when the lens support 29 is in the corresponding position.

When the carriage 44 is in the position defined by the adjustable abutment 47 and the lens support 29 is in its second position (offset laterally from the circular hole 34 through the second table 17), the top portion of the lens support 29 appears in a window (not shown) provided through the frame of the apparatus. When it is in this position, the lens support 29 may have a lens L placed thereon (or removed therefrom) manually or by an appropriate transfer means. When the lens support 29 is in its first position (in register with the circular hole 34 through the second table 17) and the carriage 44 is displaced by the actuator 46 into the position defined by adjustable abutment 48, the lens L previously placed on the lens support 29 is pressed against the adhesive face of the adhesive tape 9a of the composite tape 9 through the circular hole 34 in the second table 17.

The thrust buffer 31 is designed to be capable of fitting closely over the exposed surface of the lens L when the lens is pressed against the adhesive tape 9a and to press the adhesive against the thrust buffer 31. Although the thrust buffer 31 may comprise a pad made of a compressible and elastically deformable material, it is preferably constituted by a tool such as that described in Applicants' co-pending U.S. patent application filed Mar. 22, 1988, Ser. No. 171,742, now U.S. Pat. No. 4,831,789 issued May 23, 1989, and entitled "A tool whose shape adapts automatically to the surface of an ophthalmic lens". Briefly, as shown in FIG. 3, the thrust buffer 31 comprises a support 56 including a cavity 57 which has an opening facing the second table 17. Two elastically deformable membranes 58 and 59 are fixed by their peripheral edges to the side walls of the cavity 57 and define a space therebetween which is filled with an incompressible material in the form of small grains e.g., beads 61 of glass or steel and having a diameter of about 1 mm. Thus, when the lens L and the adhesive tape 9a are pressed against the elastically deformable membrane 59, the assembly 58–61 deforms and takes up a shape which fits closely to the adjacent face of the lens L. The assembly 58–61 can then be made temporarily rigid so as to constitute a rigid thrust surface by evacuating the space between the two elastically deformable membranes 58 and 59 via a side orifice 60 through the support 56 and connected via a connector 62 and a hose (not shown) to a vacuum source (also not shown). This may be done for each lens in turn, or the assembly may be kept rigid for a run of same-shape lenses.

The support 56 for the thrust buffer 31 is connected to the bottom end of a piston rod 63 of an actuator (e.g., a pneumatic having a cylinder 64 fixed to a carriage 65. By actuating the actuator 63, 64, the thrust buffer 31 may be moved at will away from the composite tape 9 and the second table 17 or alternatively brought into contact with the moving jaw 35, in the immediate proximity of the non-adhesive face of the adhesive tape 9a. The carriage 65 is mounted to move relative to the frame 3 and to the second table 17 (e.g., by means of a ball slideway) in a direction parallel to the plane of the table and parallel to the path followed by the composite tape 9.

The cutting device 32 is carried by a carriage 66 which is mounted to move relative to the carriage 65 (for example, by means of a ball slideway), in a direction which is perpendicular to the plane of the second table 17 and to the path followed by the composite tape 9. A cylinder 67 of an actuator (e.g., a pneumatic actuator) is fixed to the carriage 66 and a piston rod 68 of the actuator bears against the carriage 65. Thus, by actuating the actuator 67, 68, the carriage 66 may be moved between a high position in which the cutting device 32 is at a distance from the composite tape 9 and a low position in which the cutting device 32 is operational for cutting the composite tape 9. Two abutments (not shown) may be provided in order to define the high and the low positions respectively of the carriage 66. A detector 69 and detector 71 generate respective signals when the carriage 66 reaches its high position and when it reaches its low position.

The carriage 65 is connected to a piston rod 72 of an actuator (e.g., a pneumatic actuator) having a cylinder 73 fixed to the frame 3. Thus, by actuating the actuator 72, 73, the carriage 65 may be displaced at will between a first limit position in which the thrust buffer 31 is in register with the circular hole 34 through the second table 17, and a second limit position in which the cutting device 32 is in register with circular hole 34. Abutments (not shown) may be provided to define the two abovementioned limit positions of the carriage 65. Detectors may also be provided to generate respective signals when the carriage 65 reaches its first limit position and when it reaches its second limit position.

As shown in FIG. 3, the cutting device 32 may comprise a fork-shaped support 74 which is fixed to the bottom end of a hollow shaft 75 which extends perpendicularly to the second table 17. The hollow shaft 75 is rotatably mounted by suitable bearings in a support 70 fixed to the carriage 66. A shaft 76 extends inside the hollow shaft 75 and is fixed at its top end to a plate 77 which is itself fixed to the carriage 66. The shaft 75 and the fork shaped support 74 may be rotated about the shaft 76 by a motor 78 (e.g., an electric motor). A notched pulley 79 fixed to an output shaft 80 of the motor 78 transmits the rotary motion thereof by means of a notched belt 81 to another notched pulley 82 fixed on the hollow shaft 75. At least one cutting blade, and preferably two cutting blades, 83 (constituted by scalpel blades, for example) are mounted on the fork-shaped support 74 and extend parallel to the axis of the shaft 76 at equal distances therefrom. Preferably, the or both cutting blades 83 are adjustable in position relative to the axis of the shaft 76 so that the distance between them can be adjusted to match the outside diameter of the lens on which the protective film is to be applied. To this end, each of the two cutting blades 83 is fixed on a blade carrier 84. A screw 85 is rotatably mounted at each of its ends in suitable bearings in the two branches of the fork-shaped support 74. The screw 85 has two portions with oppositely-handed threads engaged in respective corresponding tapped holes in the two blade carriers 84. A bevel gear 86 is fixed to the middle of the screw 85 and meshes with a bevel gear 87 fixed to the shaft 76. Two guide pieces 88 and 89 fixed to respective ones of the blade carriers 84 prevent the blade to carriers 84 from rotating with the screw 85 while allowing them to move along the screw 85. Thus, by virtue of the meshing between the bevel gear 87 and the bevel gear 86, when the hollow shaft 75 and the fork-shaped support 74 are rotated by the motor 78, both the blade carriers 84 and the cutting blades 83 associated therewith are moved towards each other or away from each other depending on the direction of rotation of the motor 78. Since the pitches of the two threads on the screw 85 are known, as is the transmission ratio as defined by the two bevel gears 86 and 87 and by the two notched pulleys 81 and 82, it is possible to adjust the spacing between the two cutting blades 83 accurately whenever so desired by using a digitally controlled stepper motor for the motor 78. Sensors 91, 92, and 93 serve to monitor the rotation of the cutting device 32 and the position of the cutting blades 83.

The various detectors mentioned above are electrically connected to a monitoring and control box which includes a microprocessor that controls the operation of the apparatus so that it performs an operating cycle as described below.

With the lens support 29 in its second position (away from the circular hole 34 through the second table 17) and waiting for a lens, a lens is placed on the lens support 29 manually by an operator or automatically by an appropriate transfer device. Then, the operator enters a manufacturing code applicable to the lens L by means of a keyboard (not shown) with the manufacturing code informing the microprocessor, in particular, of the value D of the diameter of the lens to enable the microprocessor to rotate the motor 78 through an appropriate number of turns for adjusting the distance between the two cutting blades 83 of the cutting device 32 to a value which is slightly greater than the diameter of the lens L placed on the lens support 29 (e.g., D+1 mm). Instead of the manufacturing code being entered via the keyboard, it may be observed that the code could be prerecorded on the lens itself (e.g., in the form of a bar code). In this case, the apparatus may be fitted with a reader (e.g., a bar code reader) for reading the code and transitting it to the microprocessor. Thereafter, the operating cycle is initiated by a manual command given by the operator and/or by an enable signal generated by a detector (not shown) which may be provided on the lens support 29 and which generates the enable signal whenever it detects the presence of a lens on the lens support 29.

Thereafter, the motor 4 is started to drive the take up spool 2 so as to take up the composite tape 9 onto the take up spool 2, thereby paying tape out from the roll 8 on the spool 1. The pay out motor 4 is stopped when a hole previously formed in the strippable tape 9b of the composite tape 9 by the punch device 21 comes into register with the circular hole 34 through the second table 17. For example, the motor 4 may be stopped by a signal generated by a detector 94 (FIG. 2) which is mounted on the die 23 and which is arranged to detect the passage of the rear edge of a hole which has just been formed in the strippable tape 9b by the punch device 21, which naturally relies on the path length followed by the strippable tape 9b between the detector 94 and the edge of the circular hole 34 in the second table 17 being previously suitably adjusted so as to correspond to an integer multiple of the distance between the centers of two successive holes formed in the strippable tape 9b by the punch device 21.

At the same time, the lens support 29 is moved by the actuator device 53 into its first position (in register with the circular hole 34 through the second table 17). Immediately after the motor 4 stops, the actuator 42, 43 is actuated so as to firmly clamp the composite tape 9 between the moving jaw 35 and the region 17a. Thereafter, the actuator 63, 64 is actuated in order to bring the thrust buffer 31 into its low position in contact with the moving jaw 35. The actuator 46 is then actuated in order to displace the carriage 44 and the lens support 29 upwardly so as to press the lens L against the round portion of the adhesive face of the adhesive tape 9a which is exposed through the circular hole 34 in the second table 17 and through the circular hole in the strippable tape 9b of the composite tape 9. In this way, the lens L presses the adhesive tape 9a against the thrust buffer 31 which deforms to take up the shape of the top face of the lens L. Given that during this operation the composite tape 9 is held firmly by the movable jaw 35 and the region 17a, and given that the adhesive tape 9a is made of a relatively stretchable material, the adhesive tape is applied and stuck to the top face of the lens L without folds forming in the tape.

While the adhesive tape 9a is being applied against the top face of the lens L, the actuator 24 is actuated in order to punch a new hole in the strippable tape 9b.

Thereafter, in one possible mode of apparatus operation, the thrust buffer 31 is lifted to its high position by means of the actuator 63, 64 the carriage 65 is then moved to the left (as seen in FIGS. 1 and 3) by the actuator 72, 73, thereby bringing the cutting device 32 into register with the circular hole 34 through the second table 17. In this position, the axis of the shaft 76 is coaxially aligned with the axis of the lens carried by the lens support 29. The actuator 67, 68 is then actuated so as to lower the cutting device 32 the two cutting blades 83 of which cut through the adhesive tape 9a. Assuming that the transmission ratio determined by the two notched pulleys 79 and 82 and by the two bevel gears 86 and 87 is equal to unity and that the pitch of the two threads on the screw 85 is equal to 0.5 mm, the motor 78 is then actuated in such a manner as to cause its output shaft to form one half of a turn with each of the two cutting blades 83 describing an arc of 180°, thereby cutting out the adhesive tape 9a. In fact, each of the two cutting blades 83 describes a portion of a spiral. In addition to its rotary movement, each cutting blade 83 moves under the action of the screw 85 through 0.25 mm towards the edge of the lens L. As a result, the disk cut out by the cutting blades 83 in the adhesive tape 9a remains connected to the adhesive tape 9a at two diammetrically opposite points of the disk. However this is acceptable since the two points of attachment are very small and can easily be broken when the lens L is removed together with the adhesive disk stuck to its top face.

Thereafter, the cutting device 32 is raised to its high position by means of the actuator 67, 68 and the carriage 65 is returned by the actuator 72, 73 to its initial position in which the thrust buffer 31 is in register with the circular hole 34 through the second table 17. Simultaneously, the carriage 44 is lowered to its low position by the actuator 46, the lens support 29 is brought by the actuator device 53 to its second position (away from the circular hole 34 through the second table 17) in order to enable the lens L to be removed manually or by means of an appropriate transfer device and in order to receive a new lens on the lens support 29. The moving jaw 35 is then moved away from the composite tape 9 by the actuator 42, 43 in order to release the composite tape 9. Thereafter, the motor 4 is again actuated, and the above-described cycle is repeated with a new lens on the lens support 29.

In another mode of operation, which is preferable to the mode of operation described above from the point of view of cycle time duration, after the adhesive tape 9a has been applied to the top face of the lens L as described above, a space 95 between the adhesive tape 9a and the elastically deformable membrane 59 of the thrust buffer 31 is evacuated in order to hold the lens L beneath the thrust buffer 31. To this end, the moving jaw 35 includes a passage 96 connected via a connector 97 and a hose (not shown) to a vacuum source (also not shown). Thereafter, the carriage 44 is moved to its low position by the actuator 46, thus lowering the lens support. However, the lens L remains supported by the thrust buffer 31 both by virtue of the adhesive substance of the adhesive tape 9a and by virtue of the vacuum in the space 95. Then, the lens support 29 is moved to its second position by the actuator device 53 to await a new lens. Meanwhile, a transfer device (not shown) is brought beneath the circular hole 34 through the second table 17 in order to support the lens L. Atmospheric pressure is then re-established in the space 95, and the thrust buffer 31 is raised to its high position by the actuator 63, 64. The carriage 65 is then moved to bring the cutting device 32 into register with the circular hole 34 through the second table 17, and the cutting device 32 is actuated as described above in order to cut the adhesive tape 9a around the edge of the lens L. After this cutting operation, the cutting device 32 is returned to its high position by the actuator 67, 68 and the carriage 65 is returned to its initial position by the actuator 72, 73. Simultaneously while the lens L with the adhesive disk stuck to its top face is removed to another work station by the above-mentioned transfer device, and finally the moving jaw 35 is moved away from the composite tape 9 by the actuator 42, 43 in order to release the composite tape 9. A new operating cycle can then be begun with a new lens put into place on the lens support 29 while the operation of cutting the adhesive tape 9a by means of the cutting device 32 is being performed.

An end-of-tape detector 98 (FIG. 1) causes the apparatus to stop completely and generates a warning signal when it detects the end of the composition tape 9. Under these conditions, a new roll 8 of the composite tape 9 is installed on the pay-out spool 1. At the leading end of the composite tape 9 from the new roll 8, the adhesive tape 9a is separated from the strippable tape 9b and their leading ends are connected to the trailing, ends of the previous adhesive tape 9a and previous strippable tape 9b, of the used-up composite tape 9, which ends are still present on the first table 11. Further, if the take-up spool 2 is full at this moment, the composite tape 9 is advanced through the apparatus until the new composite tape 9 reaches the guide roll 19. The composite tape 9 is then cut with the roll of punched composite tape present on the take-up spool 2 being removed and the leading end of the new composite tape 9 being connected to the take-up spool 2. The apparatus is then again ready to operate.

From the above description, it is clear that the method and the apparatus of the present invention as described above serve to stick protective film on a series of ophthalmic lenses regardless of the diameters of the lens, without wrinkling the protective film, and with a minimum of human intervention (since the apparatus can be highly automated). In addition, the apparatus can operate at a relatively high rate. It is reasonable to estimate that such an apparatus could operate at about 500 lenses per hour.

Naturally, the embodiment of the present invention described above has been given purely by way of non-limiting example, and numerous modifications could readily be applied thereto by the person skilled in the art without going beyond the scope of the invention.

We claim:

1. Apparatus for sticking a protective film on a face of a series of ophthalmic lenses, said apparatus comprising:
   (a) a pay-out spool carrying a roll of composite tape comprising an adhesive tape having an adhesive face and a strippable backing tape covering said adhesive face;
   (b) a first set of guide rolls for guiding the composite tape along a predetermined path;
   (c) a second set of guide rolls for guiding the strippable backing tape of the composite tape along a loop path going away from said predetermined path and returning thereto;
   (d) a punch device placed on said loop path for punching a series of holes in the strippable backing tape, said series of holes having a predetermined diameter greater than a lens diameter of said series of ophthalmic lenses, whereby, after the punched strippable backing tape and the adhesive tape are brought together downstream of said loop path, each hole in the punched strippable backing tape leaves a round portion of the adhesive face of the adhesive tape exposed;
   (e) a lens support situated on one side of the predetermined path of the composite tape adjacent to the punched strippable backing tape and downstream from said loop path;
   (f) a thrust buffer situated on the other side of said predetermined path and in register with the lens support;
   (g) at least one of said lens support and said thrust buffer being mounted to move perpendicularly to said predetermined path;
   (h) at least one actuator means connected to one of said lens support and said thrust buffer for pressing the composite tape therebetween and for applying the exposed round portion of the adhesive face of the adhesive tape through a hole in the punched strippable backing tape onto a lens carried by the lens support;
   (i) a cutting device situated on said predetermined path of the composite tape downstream from the loop path for cutting out from the adhesive tape the round portion thereof which has adhered to the lens; and
   (j) drive means acting on the composite tape in order to displace it along said predetermined path.

2. Apparatus according to claim 1, wherein the punch device comprises a punch and a die having a diameter greater than the largest existing diameter of ophthalmic lenses.

3. Apparatus according to claim 1, wherein said drive means comprises a take-up spool rotated by first motor.

4. Apparatus according to claim 3, wherein the first motor rotates intermittently.

5. Apparatus according to claim 4, including:
a fixed table situated to one side of the predetermined path of the composite tape, adjacent to the strippable tape and downstream from said loop path of the strippable tape, said table including a circular hole whose diameter corresponds to the diameter of a hole formed by the punch device in the strippable tape;
a first carriage movably mounted relative to the table in a direction parallel to the axis of the hole through the table;
said lens support being mounted to move relative to the first carriage between a first position in which the lens support is in register with the hole through the table and a second position in which the lens support is offset sideways from said hole in order to receive a lens;
a first actuator means mounted on the first carriage and connected to the lens support to displace the lens support between said first and second positions; and
a second actuator means connected to the first carriage to displace the first carriage and the lens support when the lens support is in its first position between a first position in which the lens carried by the lens support is at a distance from the hole through the table, and a second position in which said lens is pressed against the adhesive face of the adhesive tape through the hole in the table and a hole in the strippable tape.

6. Apparatus according to claim 5, further including:
a second carriage movably mounted relative to the table to move in a direction parallel to the predetermined path of the composite tape;
a third actuator means mounted on the second carriage and connected to the thrust buffer to displace the buffer between a first position in which it is at a distance from the composite tape and a second position in which said thrust buffer is in the immediate proximity of the non-adhesive face of the adhesive tape of the composite tape;
a third carriage movably mounted on the second carriage to move in a direction perpendicular to the predetermined path of the composite tape, said cutting device being carried by the third carriage;
a fourth actuator means mounted between the second and third carriages to displace said third carriage between a first position in which the cutting device is at a distance from the composite tape and a second position in which the cutting device is operational to cut the adhesive tape; and
a fourth actuator means connected to the second carriage to displace it between a first position in which the thrust buffer is in register with the hole through the table, and a second position in which the cutting device is in register with said hole through the table.

7. Apparatus according to claim 6, wherein the cutting device comprises a support mounted to rotate on the third carriage about an axis which is perpendicular to the predetermined path of the composite tape and which, in the second position of the second carriage, coincides with the axis of the hole through the table, two cutting blades mounted on said support extending parallel to said axis and disposed at equal distances therefrom, and a second motor mounted on the third carriage and coupled to rotate said support together with the two cutting blades about said axis.

8. Apparatus according to claim 7, wherein the distance between the two cutting blades and said axis is adjustable.

9. Apparatus according to claim 5, further including a moving jaw having a circular hole whose inside diameter corresponds to the diameter of the hole through the table, said circular hole being in register with said hole through the table, said jaw being movable relative to the table in a direction which is substantially parallel to the axis of the hole through the table, and fifth actuator means connected to the moving jaw to displace it between a first position in which it is at a distance from the composite tape and a second position in which the composite tape is clamped between said moving jaw and a region of the table surrounding the hole through the table and constituting a fixed jaw.

* * * * *